Feb. 16, 1943.  J. G. CAMPBELL  2,311,151
ANALYSIS OF SOIL SAMPLES FOR DETERMINING OIL CONTENT
Filed May 10, 1940
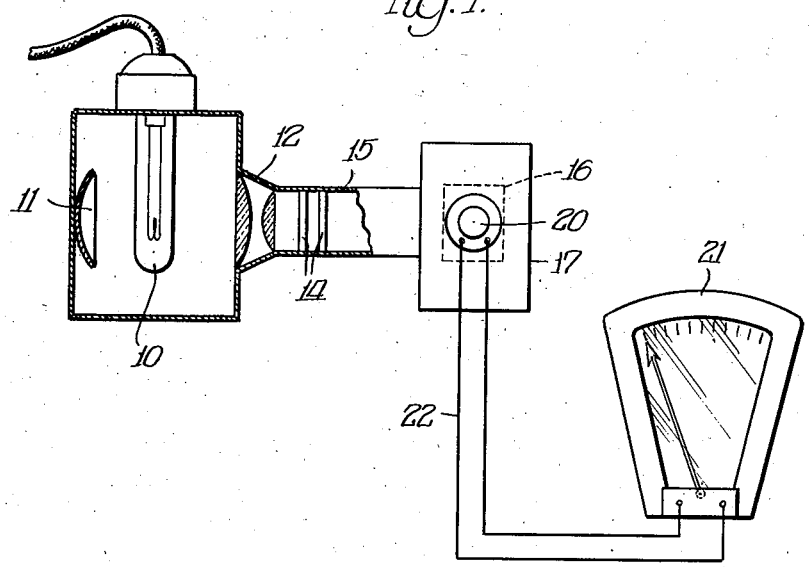
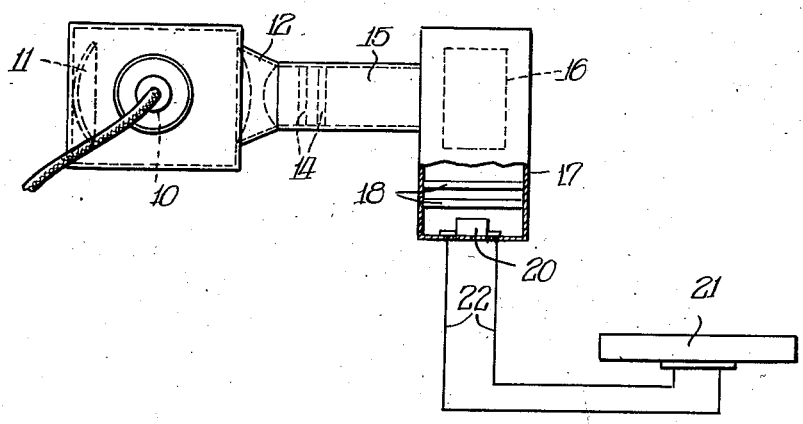
INVENTOR.
John G. Campbell,
BY Patented Feb. 16, 1943

2,311,151

UNITED STATES PATENT OFFICE 2,311,151

ANALYSIS OF SOIL SAMPLES FOR DETERMINING OIL CONTENT

John G. Campbell, Houston, Tex., assignor to Ralph H. Fash, trustee, Fort Worth, Tex.

Application May 10, 1940, Serial No. 334,341

9 Claims. (Cl. 250—71)

The invention relates to a method for use in exploring for oil and has more particular reference to an improved method for quantitatively determining the amount of oil in earth samples.

The invention is concerned with a method which consists in the quantitative determination of oil in earth samples by means of the fluorescent effect of ultra-violet light on petroleum oil for the purpose of assisting in locating and developing oil deposits. The method in its broad and basic aspect has been disclosed and claimed in my Patent No. 2,227,438 granted January 7, 1941, wherein it is stated that it is possible to make the determination at the well and to make the same more rapidly and more accurately than by any other method previously used.

Also the method as disclosed in said patent makes it possible to definitely ascertain an increase in the oil content of the strata several hundred feet above an oil producing horizon so that ample notice is thereby given of the approach to such an horizon. Heretofore productive horizons have been passed up due to uncertainty as to oil content of the strata and accordingly the oil that could be secured from the same has been lost. This is especially true of wells drilled by the rotary method where the sealing action of the mud from the rotary fluid seals off productive horizons.

A more specific object of the invention is to determine quantitatively the oil content of earth samples and also well cuttings by measuring the intensity of the fluorescence produced when an extract from the sample or cutting is subjected to ultra-violet light. I have found that while the amount of oil can be measured by means of the intensity of the fluorescence produced by the action of ultra-violet light the correlation of the results thus obtained should take into consideration the surface of the particles composing the sample. The necessity of taking this surface factor into consideration in comparing the results of the analyses of the samples for oil according to my procedure can best be understood by considering the difference in amount of oil that would adhere to a given weight of sand and the same weight of shale, if both were immersed in oil. The shale would retain a much greater quantity of oil than the sand because of the greater surface area of the particles of shale.

Accordingly, another object of the invention is to provide a factor in order to adjust the results obtained in measuring the fluorescence of the extract under ultra-violet light to compensate for the variations in the surface area of the particles making up the earth samples from which the extract was obtained.

Another object of the invention is to provide a factor for surface adjustment which will enable comparisons to be made in the results obtained from different samples within a reasonable length of time and which, although not absolutely accurate, nevertheless has been found satisfactory, it being understood that certain variations in procedure may be made without a material departure from the basic concept.

With these and various other objects in view, the invention may consist of certain novel steps in procedure and operation as will be more fully described and particularly pointed out in the specification, drawing and claims appended hereto.

In the drawing, wherein like reference characters are used to designate like parts—

Figure 1 is a side elevational view schematically illustrating an instrument for subjecting the extract to ultra-violet light and measuring the fluorescent light produced; and Figure 2 is a top plan view of the instrument schematically shown in Figure 1.

It is first of all necessary to prepare the extract of the earth sample, the oil content of which it is desired to ascertain. Any suitable solvent that will extract the petroleum oil from the earth sample may be used. I prefer to use ethyl ether. In order to eliminate the necessity for correcting the results obtained the solvent used should produce none or only a small amount of fluorescent light when exposed to ultra-violet rays. The material in solvents which will produce fluorescent light can be removed by treatment with activated carbon, such as Nuchar. When solvents are treated with activated carbons care should be taken that none of the carbon remains in the solvent because any such carbon will interfere with obtaining a proper measurement of the intensity of fluorescent light from the extract.

In preparing the extract twenty grams of the sample ground to about 150-mesh fineness is placed in a two-ounce screw-cap jar, together with 30 cc. of anhydrous ethyl ether, the screw-cap of the jar containing a tin foil covered cork liner to prevent leakage. The jar is placed in a mechanical shaker and agitated for about an hour at approximately 70 degrees Fahr. Upon removal of the jar the same is placed in a centrifuge and whirled to obtain a separation of the sample and extract. The desired portion, preferably about 10 cc. of the clear extract, is then placed in the quartz cuvette 16 of the instrument shown in the drawing and the intensity of the fluorescence measured. It will be understood that the extract placed in the cuvette 16 is a solution of petroleum oil in a solvent wherein the oil concentration is unknown. When subjected to ultra-violet light the oil content of the extract will fluoresce and the intensity of the fluorescent effect will be in proportion to the quantity of petroleum oil contained in the extract.

Said instrument may comprise any of the standard devices on the market for measuring the fluorescence of liquids and solids. The exciting light source 10 may consist of a mercury capillary arc. Behind the lamp is a reflector 11 and in front a condensing lens system 12. The filters 14 permit passage of ultra-violet light but filter all significant visible rays. The metal tube 15 allows passage of the exciting light to the cuvette 16 in the housing 17, one side of which can be removed for the introduction or withdrawal of the cuvette. The fluorescent light from the extract passes through special filters 18 to the photo-electric cell 20 connected in circuit with the galvanometer 21 either directly by the wires 22, as shown in the drawing, or indirectly through a switch control panel not shown. The fluorescent light that strikes the photo-electric cell allows a current to flow to the galvanometer proportional to the intensity of said fluorescent light. The reading on the galvanometer can be converted into terms of oil by comparing the fluorescence produced by known amounts of crude petroleum dissolved in a solvent. These standard solutions of known concentration may range preferably from .001 milligram to 1.00 milligram. In this connection, it is only necessary to calibrate the instrument by testing the standard solutions wherein the petroleum oil concentration of each is known and following such calibration the amount of oil in an unknown solution such as the extract can be readily determined. In other words a comparison is made of the fluorescence of the extract with the fluorescence of the standard solutions. Since the intensity of the fluorescent effect will be directly proportional to the oil content, it is possible to record the quantity of petroleum oil in the extract as that of the standard solution having approximately the same fluorescence. The oil content of the extract having been determined, it is possible to apply the result directly to the sample since a weighed quantity was extracted. The final result is a determination of the oil content of the earth sample on a quantitative basis.

The results obtained by reading the galvanometer must be adjusted in order to account for the variations in the surface area of the particles making up the earth sample. Any means of adjusting the oil content of samples analyzed in order to allow for variations in the surface factor at best can only be an approximation. Absolute accuracy is not as essential as the use of a method to determine a factor for surface adjustment which will enable comparisons to be made in the results obtained from different samples within a reasonable length of time. The following procedure is one which I have found suitable:

Ten grams of the earth sample previously dried at approximately 100° C. for about two hours is disintegrated in 200 cc. of distilled water to which has been added 10 cc. of a 0.5 N solution of sodium oxalate for the purpose of dispersion. This mixture is digested at a temperature of from 80° to 90° C. for about thirty minutes and then poured through a 230-mesh sieve, the liquid passing through the sieve being collected in a graduated cylinder of about 500 cc. capacity and approximately two inches by fifteen inches in size. The particles remaining on the sieve are dried, weighed and their percentage calculated, which percentage are the particles having a diameter greater than $\frac{1}{16}$ mm. The liquid in the cylinder is made up to 500 cc. with distilled water, shaken and then allowed to stand for about thirty minutes. A 5 cc. portion of the liquid is withdrawn from a point 10 cm. below the surface of the liquid by means of a pipette and the liquid placed in a tared evaporating dish, evaporated to dryness and the residue weighed. The weight of the residue after deducting that portion of the sodium oxalate contained in the 5 cc. portion is multiplied by one thousand to obtain the percentage of the particles in the sample having a diameter less than $\frac{1}{128}$ mm. The sum of the percentages of particles smaller than $\frac{1}{128}$ mm. in diameter and of the material retained on the sieve subtracted from one hundred gives the percentage of particles having a size smaller than $\frac{1}{16}$ mm. and larger than $\frac{1}{128}$ mm.

I have assumed that the average area per gram of the particles retained on the sieve, that is, the particles having a diameter greater than $\frac{1}{16}$ mm. is 200 sq. cm.; of the intermediate particles, that is, those having a diameter less than $\frac{1}{16}$ mm. and greater than $\frac{1}{128}$ mm. is 1500 sq. cm.; and of the finest particles, those having a diameter less than $\frac{1}{128}$ is 10,000 sq. cm.

For adjusting the readings obtained from the galvanometer I use the following formula:

$$Z = \frac{5000W}{A}$$

in which Z is the oil content of the earth sample adjusted to a basis of 5000 square centimeters of particle surface; in which W is the reading taken from the galvanometer or, in other words, the oil content found in the extract of the sample by measuring the fluorescence of the same, usually reported in parts per million by weight; and in which A is the summation of the particle area of the dried earth sample in units of square centimeters per gram. Since $$A = 200C + 1500M + 10,000F$$

where C is the per cent of the earth sample having a particle size greater than $\frac{1}{16}$ mm. in diameter, M is the percent of the sample having a particle size smaller than $\frac{1}{16}$ mm. and larger than $1/128$ mm. in diameter, and F is the per cent of the sample having a particle size less than $1/128$ mm. in diameter, by substitution $$Z = \frac{5000W}{200C + 1500M + 10,000F}$$

Since C, M and F refer to percentages of the various sized particles, they are expressed mathematically as parts of one, for example, 50 per cent will be expressed in the formula as .50 and 100 per cent as 1.00. The numbers 200, 1500 and 10,000 represent the average surface area of one gram of the various sized particles expressed in square centimeters. Also since W is given as parts per million by weight, that is, milligrams per thousand grams Z is therefore the weight of oil in micrograms per 5000 sq. cm. of surface area, and the results obtained by the formula can be read as micrograms per .5 square meter.

To illustrate the working of the formula several hypothetical cases will be considered. First, where the sample is composed of all coarse-sized particles whose diameter is $\frac{1}{16}$ mm.; secondly, where the sample is composed of all intermediate-sized particles, the diameter of which is greater than $1/128$ mm. but less than $\frac{1}{16}$ mm.; thirdly, of all fine-sized particles, the diameter of which is less than $1/128$ mm.; and finally, of an equal distribution of all three particle sizes mentioned. Assuming the value W to be 1.0, then by substituting in the formula submitted the equation for each of the four cases previously mention becomes as follows:

(1) $Z = \dfrac{5000 \times 1.0}{200 \times 1.00 + 1500 \times 0 + 10{,}000 \times 0} = 25.0$ (2) $Z = \dfrac{5000 \times 1.0}{200 \times 0 + 1500 \times 1.00 + 10{,}000 \times 0} = 3.3$ (3) $Z = \dfrac{5000 \times 1.0}{200 \times 0 + 1500 \times 0 + 10{,}000 \times 1.00} = 0.5$ (4) $Z = \dfrac{5000 \times 1.0}{200 \times 0.33\frac{1}{3} + 1500 \times 0.33\frac{1}{3} + 10{,}000 \times 0.33\frac{1}{3}} = 1.3$ From the above it is apparent that the surface area of the particles comprising the earth samples subjected to analysis is a very important factor. Said readings are in terms of oil concentration and by adjusting the results to include the variations in the surface area the final results can be used in exploring for oil pools. Assuming in both cases the same figure for the value W, it is seen that the adjusted results are very materially greater when the earth sample is composed entirely of large particles than when the earth sample consists entirely of the smallest particles.

With the experience gained in the application of the present invention other methods involving somewhat different procedure and a different formula may be worked out. Whatever the method used, it should have the advantage of enabling comparisons to be made within a reasonable length of time and the same should be approximately accurate. The procedure and formula herein described may be considered the preferred embodiment of the invention although it is to be understood that the same is merely by way of illustration since I do not intend to be bound thereby but only by the scope of the following claims.

What is claimed is:

1. A method for use in exploring for petroleum oil, which consists in preparing an extract by treating an earth sample with an oil solvent to extract from said sample any petroleum oil contained therein, subjecting the extract to ultra-violet light to produce a fluorescent effect of an intensity proportional to the amount of oil contained in the extract, measuring the intensity of said fluorescent effect to obtain a quantitative determination of the amount of oil in the earth sample, and in adjusting the result thus obtained as to oil content to express the result as an amount of oil per unit area, to thereby compensate for variations in the surface area of the earth particles comprising the sample.

2. A method for use in exploring for petroleum oil, which consists in preparing an extract by treating an earth sample with an oil solvent to extract from said sample any petroleum oil contained therein, subjecting the extract to ultra-violet light to produce a fluorescent effect of an intensity proportional to the amount of oil contained in the extract, measuring the intensity of said fluorescent effect to obtain a quantitative determination of the amount of oil in the earth sample, analyzing the earth sample to determine the surface area of the earth particles constituting the same, and in adjusting the result previously obtained as to oil content by using the data from said analysis to express the said result as an amount of oil per unit area, to thereby compensate for variations in the surface area of the earth particles comprising the sample.

3. A method for use in exploring for petroleum oil, which consists in preparing an extract by treating an earth sample with an oil solvent to extract from said sample any petroleum oil contained therein, subjecting the extract to ultra-violet light to produce a fluorescent effect of an intensity proportional to the amount of oil contained in the extract, measuring the intensity of said fluorescent effect to obtain a quantitative determination of the amount of oil in the earth sample, analysing the earth sample to determine the surface area of the large earth particles, intermediate size earth particles and small earth particles, and in adjusting the result previously obtained as to oil content by using the data from said analysis to express the said result as an amount of oil per unit area, to thereby compensate for variations in the surface area of the earth particles comprising the sample.

4. A method for use in exploring for petroleum oil, which consists in preparing an extract by treating an earth sample with an oil solvent to extract from said sample any petroleum oil contained therein, subjecting the extract to ultra-violet light to produce a fluorescent effect of an intensity proportional to the amount of oil contained in the extract, measuring the intensity of said fluorescent effect to obtain a quantitative determination of the amount of oil in the earth sample, analyzing the earth sample to ascertain the percentage of the sample consisting of large earth particles, intermediate size earth particles and small earth particles, and in adjusting the result previously obtained as to oil content by using the percentages from said analysis to thereby compensate for variations in the surface area of the earth particles comprising the sample, said adjusting step including the use of a formula wherein the said result as to oil content per unit weight is multiplied by a factor which represents the ratio of a unit area to the area of the particles of the sample, whereby the adjusted oil content is expressed as an amount of oil per unit area.

5. A method for use in exploring for petroleum oil, which consists in preparing an extract by treating an earth sample with an oil solvent to extract from said sample any petroleum oil contained therein, subjecting the extract to ultra-violet light to produce a fluorescent effect of an intensity proportional to the amount of oil contained in the extract, measuring the intensity of said fluorescent effect to obtain a quantitative determination of the amount of oil in the earth sample, analyzing the earth sample to ascertain the percentage of the sample consisting of large earth particles, intermediate size earth particles and small earth particles, and in adjusting the result previously obtained as to oil content by using the percentages from said analysis to thereby compensate for variations in the surface area of the earth particles comprising the sample, said last mentioned step including the use of a formula wherein the said result as to oil content expressed in milligrams per thousand grams is multiplied by a factor which represents the ratio of a unit area to the area of the particles of the sample, whereby the adjusted oil content is expressed as an amount of oil per unit area.

6. A method for use in exploring for oil, which consists in determining the oil content of earth samples by extracting the petroleum oil from a measured quantity of each earth sample, and in subjecting each of said oil extracts to ultra-violet light so that a comparison may be made of the fluorescence of the same with the fluorescence of standard solutions wherein the oil concentration is known, analyzing each earth sample to ascertain the percentage of the sample consisting of relatively large particles greater than $\frac{1}{8}$ mm. in diameter, the percentage consisting of intermediate particles less than $\frac{1}{8}$ mm. and greater than $\frac{1}{128}$ mm. in diameter, and the percentage consisting of small particles less than $\frac{1}{128}$ mm. in diameter, and in adjusting the results previously determined as to oil content to compensate for the variation in surface area of the various size earth particles by using the formula $$Z = \frac{5000W}{200C + 1500M + 10{,}000F}$$

wherein Z is the oil content of the earth sample adjusted to a basis of 5,000 sq. cm. of particle surface; wherein W is the oil content previously determined in parts per million by weight; in which C is the percent of the earth sample consisting of relatively large particles; M is the percent of the sample consisting of intermediate particles; and F is the per cent of the sample consisting of small particles.

7. A method for determining the petroleum oil content of earth samples, which consists in preparing standard solutions of petroleum oil with a solvent wherein the petroleum oil concentration of each is known, subjecting said standard solutions to ultra-violet light to cause the same to fluoresce, measuring the fluorescence for each standard solution by means of a light sensitive instrument, calibrating the said instrument by recording the measurements thereon as indicating the oil content of the respective standard solutions, extracting the petroleum oil from earth samples by means of a solvent to form solutions, the petroleum oil concentration of each being unknown, subjecting each unknown solution to ultra-violet light to cause the same to fluoresce, and in recording the fluorescence as indicated by said light sensitive instrument in terms of oil content for the respective unknown solutions.

8. A method for determining the oil content of earth samples, which consists in extracting the petroleum oil from each earth sample by means of a solvent to form individual solutions, the petroleum oil concentration of each being unknown, subjecting each unknown solution to ultra-violet light to cause the same to fluoresce, and in measuring the fluorescence by means of a light sensitive instrument, said instrument having been previously calibrated so that the said measurements indicate the oil content of the respective unknown solutions.

9. A method for determining the oil content of solutions including petroleum oil and a solvent wherein the petroleum oil concentration is unknown, which consists in preparing standard solutions of petroleum oil with a solvent, the petroleum oil concentration of each being known, subjecting each standard solution to ultra-violet light to cause the same to fluoresce, measuring the fluorescence for each standard solution by means of a light sensitive instrument, and in calibrating said instrument by said measurements, whereby solutions wherein the petroleum oil concentration is unknown can be subjected to ultra-violet light and the fluorescence recorded by said light sensitive instrument as indicating the oil content of the respective unknown solutions.

JOHN G. CAMPBELL.